(12) United States Patent
Xu et al.

(10) Patent No.: US 10,844,806 B2
(45) Date of Patent: Nov. 24, 2020

(54) METHOD AND APPARATUS FOR DETECTING DRIFT OF PILOT

(71) Applicant: Robert Bosch GmbH, Stuttgart (DE)

(72) Inventors: Ying Xu, Jiangsu (CN); Tian Zhang, Jiangsu (CN); Yong Zhao, Jiangsu (CN)

(73) Assignee: Robert Bosch GmbH, Stuttgart (DE)

( * ) Notice: Subject to any disclaimer, the term of this patent is extended or adjusted under 35 U.S.C. 154(b) by 342 days.

(21) Appl. No.: 15/699,026

(22) Filed: Sep. 8, 2017

(65) Prior Publication Data
US 2018/0073461 A1   Mar. 15, 2018

(30) Foreign Application Priority Data
Sep. 13, 2016 (CN) .......................... 2016 1 0821962

(51) Int. Cl.
*F02D 41/40* (2006.01)
*F02D 41/08* (2006.01)
(Continued)

(52) U.S. Cl.
CPC ............ *F02D 41/403* (2013.01); *F02D 41/08* (2013.01); *F02D 41/1497* (2013.01);
(Continued)

(58) Field of Classification Search
CPC .. F02D 41/402; F02D 41/403; F02D 41/1497; F02D 41/2467; F02D 41/247
(Continued)

(56) References Cited

U.S. PATENT DOCUMENTS

| 6,328,014 B1 * | 12/2001 | Bradshaw ........... F02D 41/1498 |
| | | 123/300 |
| 7,552,709 B2 * | 6/2009 | Fujii ................... F02D 41/2438 |
| | | 123/299 |

(Continued)

FOREIGN PATENT DOCUMENTS

| CN | 101109335 A | 1/2008 |
| EP | 2672096 A1 | 12/2013 |
| JP | 2008309081 A | 12/2008 |

*Primary Examiner* — Erick R Solis
*Assistant Examiner* — Robert A Werner
(74) *Attorney, Agent, or Firm* — Michael Best & Friedrich LLP (57) ABSTRACT

Method and apparatus for detecting drift of pilot, wherein the method includes: measuring two rotation speeds corresponding to each detection point of at least one detection point when an engine equipped with an injector is in an idle state, wherein the detection point is point(s) of an injection curve measured under the condition that a current injection pressure is applied to the injector when there is no drift of pilot in the injector, energizing time indicated by the point(s) being less than a predefined value, one rotation speed is a rotation speed of the engine during a certain working cycle of a cylinder injected by the injector, the injector being energized for an energizing time indicated by that detection point in a pilot period of the cycle, and another rotation speed is a rotation speed of the engine during an another working cycle of the cylinder, the injector not being energized in the pilot period of the cycle; calculating a current engine rotation speed change corresponding to the detection point; acquiring an indication value corresponding to the detection point; and determining whether there is drift of pilot in the injector, based on the indication value.

11 Claims, 4 Drawing Sheets

(51) Int. Cl.
  *F02D 41/22* (2006.01)
  *F02D 41/14* (2006.01)
  *F02D 41/24* (2006.01)
  *F02M 61/16* (2006.01)

(52) U.S. Cl.
  CPC .......... *F02D 41/221* (2013.01); *F02D 41/247* (2013.01); *F02D 2200/1012* (2013.01); *F02M 61/168* (2013.01); *Y02T 10/44* (2013.01)

(58) Field of Classification Search
  USPC ................ 701/103, 110, 114; 123/436, 299; 73/114.25, 114.45, 114.48
  See application file for complete search history.

(56) References Cited

U.S. PATENT DOCUMENTS

| | | |
|---|---|---|
| 10,344,704 B2 * | 7/2019 | Ottikkutti |
| 2006/0090733 A1 * | 5/2006 | Fujii .................. F02D 41/2438 123/446 |

\* cited by examiner

METHOD AND APPARATUS FOR DETECTING DRIFT OF PILOT

BACKGROUND OF THE INVENTION

The invention relates to a field of an engine, and more particularly to a method and an apparatus for detecting whether there is drift of pilot in an injector of the engine.

The engine generally needs injectors for injecting fuel (e.g., petrol, diesel, etc.) into its cylinders to drive rotation of the engine. Typically, the engine has one or more cylinders, each of which is equipped with an injector. The injector may inject fuel into a corresponding cylinder of the engine when it is energized, and stop fuel injection into the corresponding cylinder when it is not energized. For each cylinder of the engine, every time energy conversion usually experiences a continuous work process of inhaling air, compressing air, injecting fuel, making burning to expand and work, and discharging a generated exhaust. The work process is called a working cycle for each cylinder of the engine. Each working cycle typically includes a pilot period in which the injector will inject a small amount of fuel into the cylinder so that the fuel injected in a subsequent main injection period is better combusted.

Figure 1:
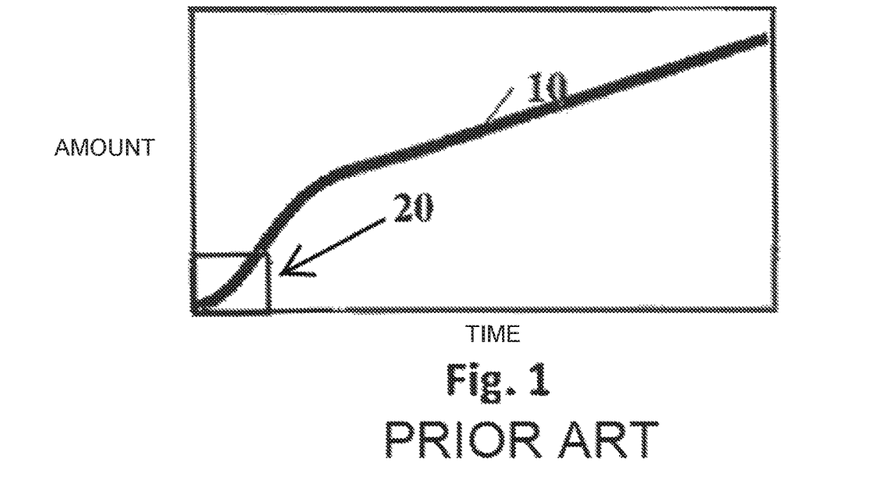
FIG. 1 shows an example of the injection curve of a prior art fuel injector.

In the case where an injection pressure is applied, the injector will inject fuel when it is energized. In the case where the applied injection pressure is determined, fuel injection amount of the injector is substantially positively correlated with an energizing time of the injector. A curve representing a correspondence between the energizing time and the fuel injection amount of the injector at a specific injection pressure is called an injection curve of the injector, as shown in FIG. 1. Wherein, in FIG. 1, a vertical axis represents the fuel injection amount of the injector, and a horizontal axis represents the energizing time of the injector. The injection curves of the injector at different injection pressures are different.

FIG. 1 also shows a pilot plateau 20, which is an area where a curve part with a small energizing time (i.e., a curve part corresponding to the pilot) shown in the injection curve is located. Some engine inspection specifications (e.g., CARB OBD II specifications, etc.) require to measure whether there is drift of pilot when the injector of the engine operates in the pilot plateau 20.

SUMMARY OF THE INVENTION

Embodiments of the invention provide a method and an apparatus for detecting drift of pilot, which can effectively detect whether there is drift of pilot in the injector of the engine.

A method for detecting drift of pilot according to an embodiment of the invention comprises: measuring two rotation speeds corresponding to each detection point of at least one detection point when a first engine equipped with an injector is in an idle state, wherein the at least one detection point is point(s) of an injection curve measured under the condition that a current injection pressure of the injector is applied to the injector when there is no drift of pilot in the injector, energizing time indicated by the point(s) being less than a predefined value, one of the two rotation speeds corresponding to each detection point of the at least one detection point is a rotation speed of the first engine during a certain working cycle of a cylinder of the first engine that is injected by the injector, the injector being energized for an energizing time indicated by that detection point in a pilot period of the certain working cycle, and another of the two rotation speeds corresponding to each detection point of the at least one detection point is a rotation speed of the first engine during an another working cycle of the cylinder, the injector not being energized in the pilot period of the another working cycle; calculating a difference of the two rotation speeds corresponding to each detection point of the at least one detection point, as a current engine rotation speed change corresponding to that detection point; acquiring an indication value corresponding to each detection point of the at least one detection point, which indicates a difference between the current engine rotation speed change corresponding to that detection point and a reference engine rotation speed change corresponding to that detection point that is measured when there is no drift of pilot in the injector; and, determining whether there is drift of pilot in the injector, based on the indication value corresponding to each detection point of the at least one detection point.

An apparatus for detecting drift of pilot according to an embodiment of the invention comprises: a measuring module for measuring two rotation speeds corresponding to each detection point of at least one detection point when a first engine equipped with an injector is in an idle state, wherein the at least one detection point is point(s) of an injection curve measured under the condition that a current injection pressure of the injector is applied to the injector when there is no drift of pilot in the injector, energizing time indicated by the point(s) being less than a predefined value, one of the two rotation speeds corresponding to each detection point of the at least one detection point is a rotation speed of the first engine during a certain working cycle of a cylinder of the first engine that is injected by the injector, the injector being energized for an energizing time indicated by that detection point in a pilot period of the certain working cycle, and another of the two rotation speeds corresponding to each detection point of the at least one detection point is a rotation speed of the first engine during an another working cycle of the cylinder, the injector not being energized in the pilot period of the another working cycle; a calculating module for calculating a difference of the two rotation speeds corresponding to each detection point of the at least one detection point, as a current engine rotation speed change corresponding to that detection point; an acquiring module for acquiring an indication value corresponding to each detection point of the at least one detection point, which indicates a difference between the current engine rotation speed change corresponding to that detection point and a reference engine rotation speed change corresponding to that detection point that is measured when there is no drift of pilot in the injector; and, a determining module for determining whether there is drift of pilot in the injector, based on the indication value corresponding to each detection point of the at least one detection point.

It can be seen from the above that the solutions of the embodiments of the invention detects whether there is drift of pilot in the injector based on that change of fuel pilot mode of the engine in idle state at the two cases where there is drift pilot and no drift pilot in the injector results in different rotation speed changes of the engine, and the solutions of the embodiments of the invention can thus effectively detect whether there is drift of pilot in the injector of the engine.

DESCRIPTION OF THE DRAWINGS

The features, characteristics, advantages and benefit of the present invention will become apparent from the following detailed description taken in conjunction with the accompanying drawings.

DETAILED DESCRIPTION

Hereinafter, various embodiments of the present invention will be described in detail with reference to the accompanying drawings.

Figure 2A:
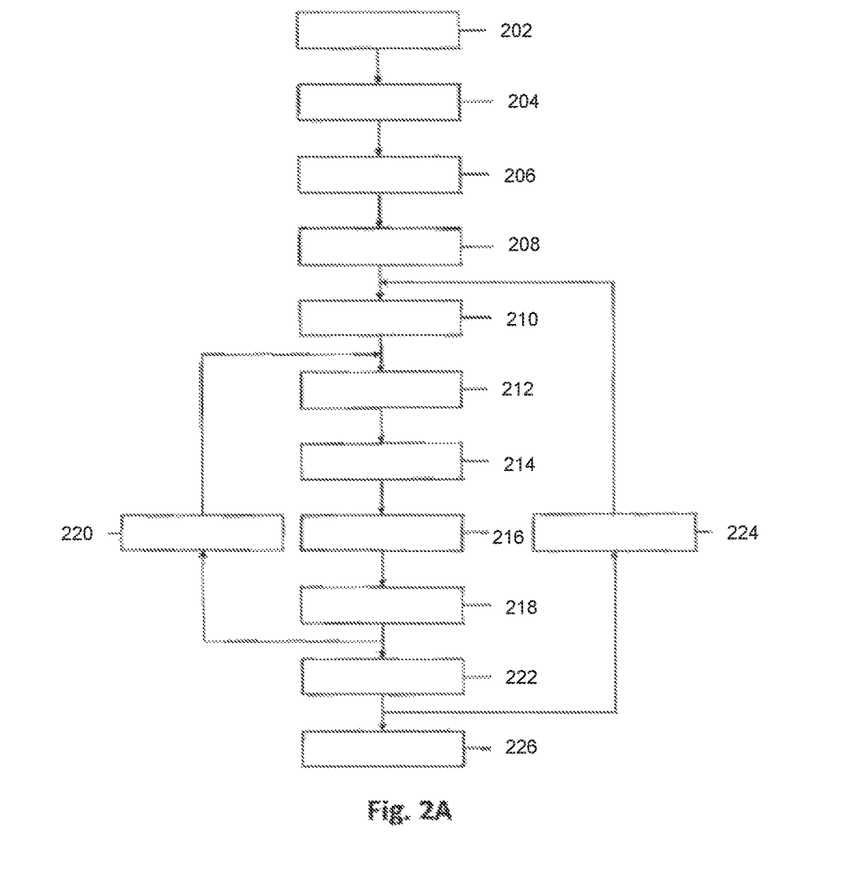
FIG. 2A shows a flowchart of a method for acquiring test reference data according to an embodiment of the invention.

FIG. 2A shows a flowchart of a method for acquiring test reference data according to an embodiment of the invention.

As shown in FIG. 2A, at block 202, injection curve(s) of an injector P without drift of pilot in the case where different injection pressures are applied are measured to obtain injection curve set S of the injector P. Wherein, the injection curve set S includes at least one injection curve, and each injection curve in the injection curve set S corresponds to an injection pressure.

Figure 2B:
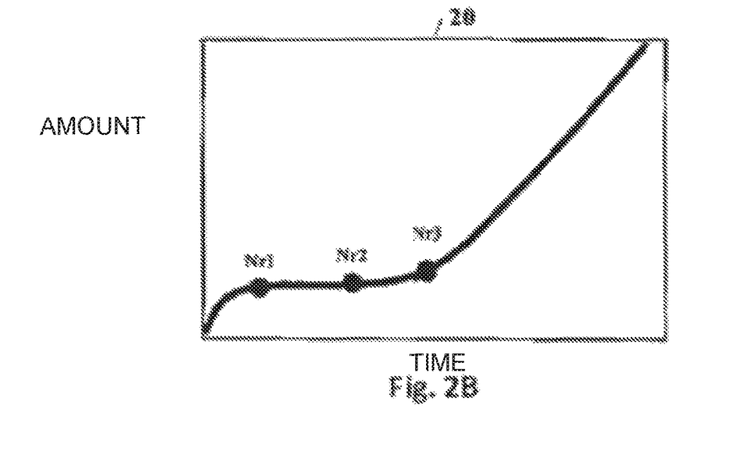
FIG. 2B shows examples of detection points of the injection curve.

At block 204, at least one point on a curve part of each injection curve Sk of the injection curve set S of the injector P is selected as detection point(s) of the injection curve Sk, to obtain detection point set C of the injection curve Sk, wherein the curve part is located within the pilot plateau. Those skilled in the art will appreciate that the detection point set C of each injection curve Sk includes at least one detection point, and the energizing time indicated by each detection point of the detection point set C is less than a predefined value due to the characteristics of the pilot plateau, wherein the predefined value represents a range of the pilot plateau and it is usually not a constant value. The predefined value may, for example, depend on one or more the following conditions: a type of the injector, design parameters of a solenoid valve assembly of the injector, nozzle design parameters, applied injection pressure and so on. In an aspect, the predefined value may be, for example but not limited to, 350 microseconds~450 microseconds. FIG. 2B shows example detection points Nr1, Nr2 and Nr3 of the injection curve.

At block 206, the injector P is installed on an engine E for injecting fuel into a cylinder CY1 of the engine E.

At block 208, an injection curve is selected from the injection curve set S of the injector P as an injection curve Si.

At block 210, a detection point is selected from the detection point set C of the injection curve Si as a detection point Ci.

At block 212, a rotation speed of the engine E during a working cycle $G_i$ of the cylinder CY1 is measured as a rotation speed R1 when the engine E is in idle state. Wherein, the injector P for the cylinder CY1 is energized for a specified time in the pilot period of the working cycle $G_i$ and the specified time is equal to the energizing time indicated by the detection point Ci.

At block 214, a rotation speed of the engine E during a working cycle $G_{i+1}$ of the cylinder CY1 is measured as a rotation speed R2 when the engine E is in idle state. Wherein, the working cycle $G_i$ is followed immediately by the working cycle $G_{i+1}$, and the injector P for the cylinder CY1 is not energized in the pilot period of the working cycle $G_{i+1}$, that is, the pilot is stopped in the pilot period of the working cycle $G_{i+1}$.

At block 216, a rotation difference between the rotation speed R1 and the rotation speed R2 is calculated as reference engine rotation speed change corresponding to the detection point Ci of the injection curve Si that is measured when there is no drift of pilot in the injector P.

At block 218, it is judged whether there is an unselected detection point in the detection point set C of the injection curve Si.

At block 220, if the judgment result of block 218 is confirmative, an unselected detection point is selected from the detection point set C of the injection curve Si as the detection point Ci, and then the flow goes back to block 212.

If the judgment result of block 218 is negative, the flow proceeds to block 222.

At block 222, it is further judged whether there is an unselected injection curve in the injection curve set S.

At block 224, if the judgment result of block 222 is confirmative, an unselected injection curve is selected from the injection curve set S as the injection curve Si, and then the flow goes back to block 210.

If the judgment result of block 222 is negative, it is indicated that the reference engine rotation speed change(s) corresponding to the detection point(s) of each of the injection curve(s) included in the injection curve set S of the injector P that is measured when there is no drift of pilot in the injector P are obtained, and then the flow proceeds to block 226.

At block 226, the injection curve(s) included in the injection curve set S of the injector P and corresponding injection pressure(s) thereof, the detection point set C of each of the injection curve(s) included in the injection curve set S, the energizing time indicated by each of the detection point(s) included in the detection point set C of each of the injection curve(s) included in the injection curve set S, and the reference engine rotation speed change corresponding to each of the detection point(s) included in the detection point set C of each of the injection curve(s) included in the injection curve set S are stored as the test reference data. The test reference data may be stored in, for example, a vehicle-mounted computer of a vehicle, an engine electronic control unit (ECU) of a vehicle, or any suitable device.

Figure 3:
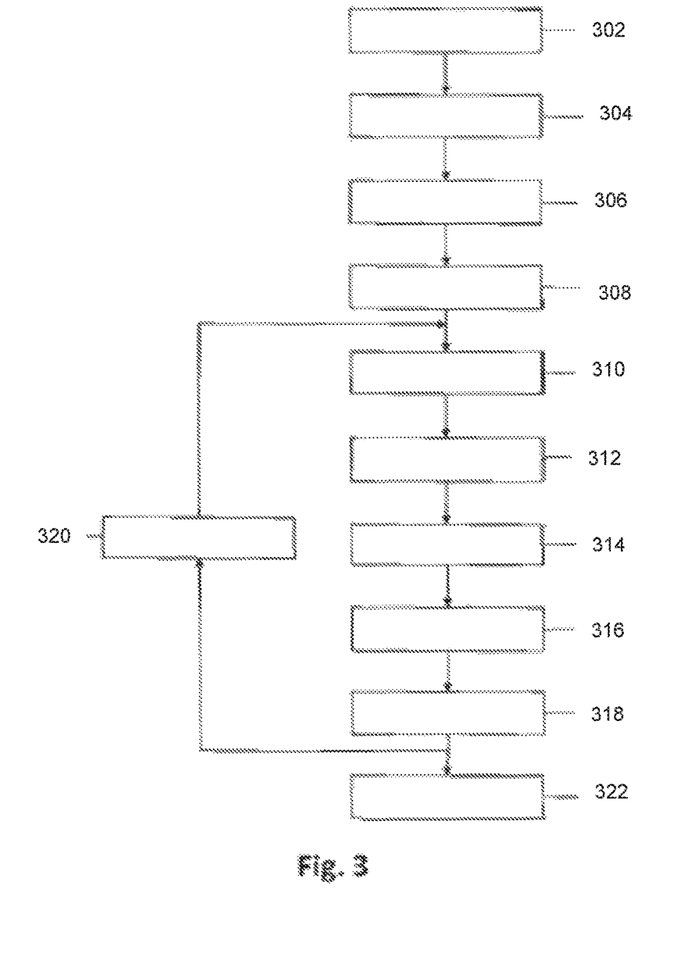
FIG. 3 shows a flowchart of a method for detecting drift of pilot according to an embodiment of the invention.

FIG. 3 shows a flowchart of a method for detecting drift of pilot according to an embodiment of the invention. Here, it is assumed to detect whether there is drift of pilot in an injector Q installed on an engine K and for injecting fuel into a cylinder CY2 of the engine K, wherein the test reference data of the injector Q installed on the engine K has been obtained in advance by the method shown in FIG. 2A for example and is stored in the vehicle-mounted computer of a vehicle where the engine K is located, the ECU of the engine K, or any suitable device. Here, the engine K and the engine E are different or the same. The method shown in FIG. 3 may be executed by the vehicle-mounted computer of the vehicle where the engine K is located, the ECU of the engine K, a detection device, or any suitable device.

As shown in FIG. 3, at block 302, a current injection pressure of the injector Q installed on the engine K is detected.

At block 304, an injection curve Sp of the injection curve set S of the engine Q corresponding to the detected current injection pressure is determined based on the injection curve(s) included in the injection curve set S of the injector P and corresponding injection pressure(s) thereof, which are included in the stored test reference data of the injector Q.

At block 306, the detection point set C of the injection curve Sp, the energizing time indicated by each of the detection point(s) included in the detection point set C of the injection curve Sp, and the reference engine rotation speed change corresponding to each of the detection point(s) included in the detection point set C of the injection curve Sp are obtained based on the detection point set C of each of the injection curve(s) included in the injection curve set S of the injector Q, the energizing time indicated by each of the detection point(s) included in the detection point set C of each of the injection curve(s) included in the injection curve set S, and the reference engine rotation speed change corresponding to each of the detection point(s) included in the detection point set C of each of the injection curve(s) included in the injection curve set S, which are included in the stored test reference data of the engine Q.

At block 308, a detection point is selected from the detection point set C of the injection curve Sp as a detection point Ct.

At block 310, a rotation speed of the engine K during a working cycle $X_i$ of the cylinder CY2 is measured as a rotation speed ROT1 when the engine K is in idle state. Wherein, the injector Q is energized in the pilot period of the working cycle $X_i$ to pre-inject fuel into the cylinder CY2 and the energizing time of the injector Q is equal to the energizing time indicated by the detection point Ct.

At block 312, a rotation speed of the engine K during a working cycle $X_{i+1}$ of the cylinder CY2 is measured as a rotation speed ROT2 when the engine K is in idle state. Wherein, the working cycle $X_i$ is followed immediately by the working cycle $X_{i+1}$, and the injector Q is not energized in the pilot period of the working cycle $X_{i+1}$.

At block 314, a rotation difference between the rotation speed ROT1 and the rotation speed ROT2 is calculated as current engine rotation speed change corresponding to the detection point Ct of the injection curve Sp.

At block 316, a difference between the current engine rotation speed change corresponding to the detection point Ct and the reference engine rotation speed change corresponding to the detection point Ct is calculated as an indication value corresponding to the detection point Ct.

At block 318, it is judged whether there is an unselected detection point in the detection point set C of the injection curve Sp.

At block 320, if the judgment result of block 318 is confirmative, an unselected detection point is selected from the detection point set C of the injection curve Sp as the detection point Ct, and then the flow goes back to block 310.

If the judgment result of block 318 is negative, the flow proceeds to block 322.

At block 322, whether there is drift of pilot in the injector Q is judged based on the indication value(s) corresponding to the detection point(s) of the detection point set C of the injection curve Sp. For example but not limited to, if the number of indication values that are larger than a specified threshold value and are in the indication value(s) corresponding to the detection point(s) of the detection point set C of the injection curve Sp are larger than a specified number, it is determined that there is drift of pilot in the injector Q.

It can be seen from the above description that the solution of the above embodiment of the invention detects whether there is drift of pilot in the injector based on that change of fuel pilot mode of the engine in idle state at the two cases where there is drift pilot and no drift pilot in the injector results in different rotation speed changes of the engine, and the solution of the above embodiment of the invention can thus effectively detect whether there is drift of pilot in the injector of the engine.

Those skilled in the art will appreciate that although in the above embodiment, the working cycle $X_i$ is followed immediately by the working cycle $X_{i+1}$, the invention is not so limited. In other some embodiments of the invention, the working cycle $X_{i+1}$ may be after the working cycle $X_i$ but is not a working cycle right next to the working cycle $X_1$, or, the working cycle $X_{i+1}$ is immediately before the working cycle $X_1$, or the working cycle $X_{i+1}$ is before the working cycle $X_i$ but is not a working cycle right next to the working cycle $X_i$.

Those skilled in the art will appreciate that although in the above embodiment, the working cycle $G_i$ is followed immediately by the working cycle $G_{i+1}$, the invention is not so limited. In other some embodiments of the invention, the working cycle $G_{i+1}$ may be after the working cycle $G_i$ but is not a working cycle right next to the working cycle $G_i$, or, the working cycle $G_{i+1}$ is immediately before the working cycle $G_i$, or the working cycle $G_{i+1}$ is before the working cycle $G_i$ but is not a working cycle right next to the working cycle $G_i$.

Figure 4:
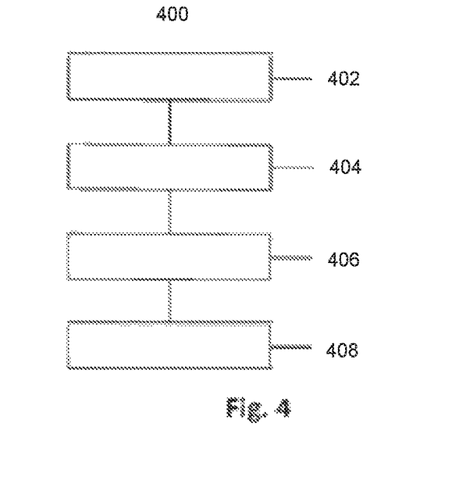
FIG. 4 shows a flowchart of a method for detecting drift of pilot according to an embodiment of the invention.

FIG. 4 shows a flowchart of a method for detecting drift of pilot according to an embodiment of the invention. The method shown in FIG. 4 may be executed for example by the vehicle-mounted computer, the engine ECU or any suitable device.

As shown in FIG. 4, the method 400 may include, at block 402, measuring two rotation speeds corresponding to each detection point of at least one detection point when a first engine equipped with an injector is in an idle state, wherein the at least one detection point is point(s) of an injection curve measured under the condition that a current injection pressure of the injector is applied to the injector when there is no drift of pilot in the injector, energizing time indicated by the point(s) being less than a predefined value, one of the two rotation speeds corresponding to each detection point of the at least one detection point is a rotation speed of the first engine during a certain working cycle of a cylinder of the first engine that is injected by the injector, the injector being energized for an energizing time indicated by that detection point in a pilot period of the certain working cycle, and another of the two rotation speeds corresponding to each detection point of the at least one detection point is a rotation speed of the first engine during an another working cycle of the cylinder, the injector not being energized in the pilot period of the another working cycle.

The method 400 may also include, at block 404, calculating a difference of the two rotation speeds corresponding to each detection point of the at least one detection point, as a current engine rotation speed change corresponding to that detection point.

The method 400 may also include, at block 406, acquiring an indication value corresponding to each detection point of the at least one detection point, which indicates a difference between the current engine rotation speed change corresponding to that detection point and a reference engine rotation speed change corresponding to that detection point that is measured when there is no drift of pilot in the injector; and The method 400 may also include, at block 408, determining whether there is drift of pilot in the injector, based on the indication value corresponding to each detection point of the at least one detection point.

At an aspect, the reference engine rotation speed change corresponding to each detection point of the at least one detection point indicates a difference between a first rotation speed and a second rotation speed corresponding to that detection point and measured under the condition that a second engine equipped with the injector is in an idle state when there is no drift of pilot in the injector, wherein the first rotation speed is a rotation speed of the second engine during a first working cycle of a specified cylinder of the second engine that is injected by the injector, the injector being energized for an energizing time indicated by that detection point in the pilot period of the first working cycle, and the second rotation speed is a rotation speed of the second engine during a second working cycle of the specified cylinder, the injector not being energized in the pilot period of the second working cycle.

At another aspect, the certain working cycle is followed immediately by the another working cycle.

At again aspect, the first working cycle is followed immediately by the second working cycle.

At yet another aspect, the first engine and the second engine are the same engine.

Figure 5:
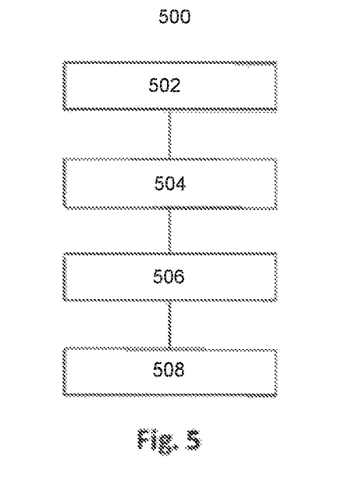
FIG. 5 shows a schematic diagram of an apparatus for detecting drift of pilot according to an embodiment of the invention.

FIG. 5 shows a schematic diagram of an apparatus for detecting drift of pilot according to an embodiment of the invention. The apparatus 500 shown in FIG. 5 may be implemented in software, hardware, or combination of hardware and software, and may be installed for example in the vehicle-mounted computer, the engine ECU or any suitable device.

As shown in FIG. 5, the apparatus 500 may include a measuring module 502, a calculating module 504, an acquiring module 506 and a determining module 508. The measuring module 502 is configured for measuring two rotation speeds corresponding to each detection point of at least one detection point when a first engine equipped with an injector is in an idle state, wherein the at least one detection point is point(s) of an injection curve measured under the condition that a current injection pressure of the injector is applied to the injector when there is no drift of pilot in the injector, energizing time indicated by the point(s) being less than a predefined value, one of the two rotation speeds corresponding to each detection point of the at least one detection point is a rotation speed of the first engine during a certain working cycle of a cylinder of the first engine that is injected by the injector, the injector being energized for an energizing time indicated by that detection point in a pilot period of the certain working cycle, and another of the two rotation speeds corresponding to each detection point of the at least one detection point is a rotation speed of the first engine during an another working cycle of the cylinder, the injector not being energized in the pilot period of the another working cycle. The calculating module 504 is configured for calculating a difference of the two rotation speeds corresponding to each detection point of the at least one detection point, as a current engine rotation speed change corresponding to that detection point. The acquiring module 506 is configured for acquiring an indication value corresponding to each detection point of the at least one detection point, which indicates a difference between the current engine rotation speed change corresponding to that detection point and a reference engine rotation speed change corresponding to that detection point that is measured when there is no drift of pilot in the injector. The determining module 508 is configured for determining whether there is drift of pilot in the injector, based on the indication value corresponding to each detection point of the at least one detection point.

In an aspect, the reference engine rotation speed change corresponding to each detection point of the at least one detection point indicates a difference between a first rotation speed and a second rotation speed corresponding to that detection point and measured under the condition that a second engine equipped with the injector is in an idle state when there is no drift of pilot in the injector, wherein the first rotation speed is a rotation speed of the second engine during a first working cycle of a specified cylinder of the second engine that is injected by the injector, the injector being energized for an energizing time indicated by that detection point in the pilot period of the first working cycle, and the second rotation speed is a rotation speed of the second engine during a second working cycle of the specified cylinder, the injector not being energized in the pilot period of the second working cycle.

In another aspect, the certain working cycle is followed immediately by the another working cycle.

In a further aspect, the first working cycle is followed immediately by the second working cycle.

In yet another aspect, the first engine and the second engine are the same engine.

Figure 6:
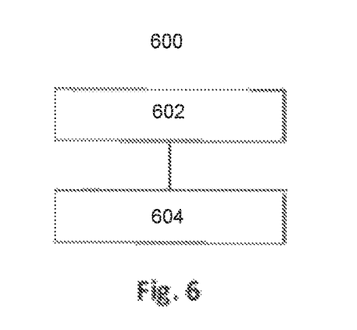
FIG. 6 shows a schematic diagram of a device for detecting drift of pilot according to an embodiment of the invention.
Figure 7:
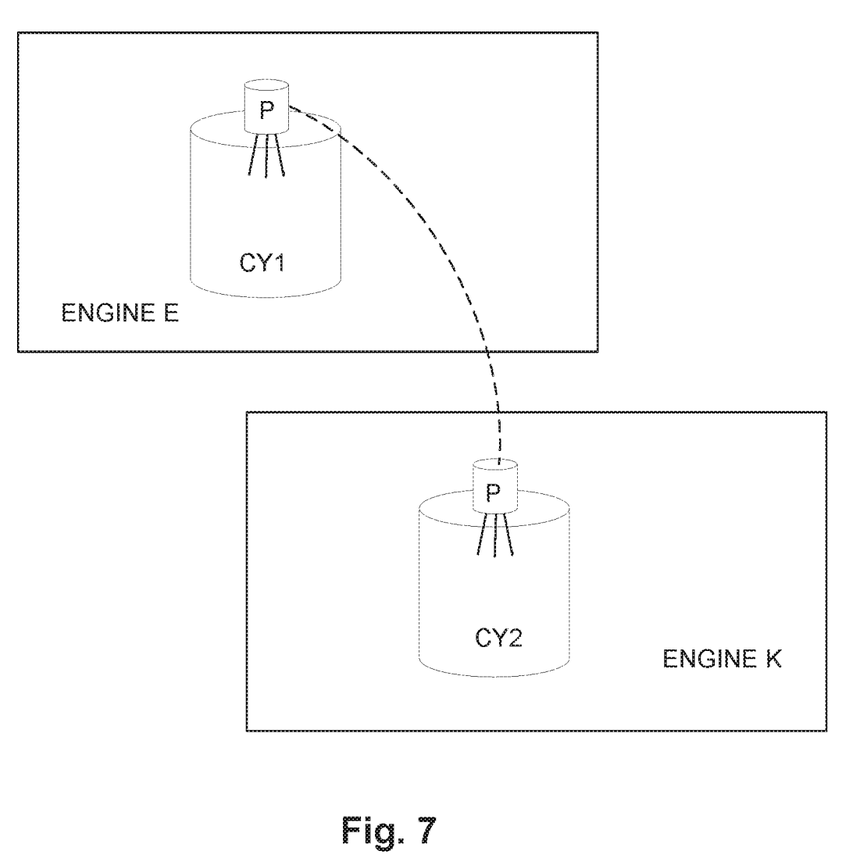
FIG. 7 shows a schematic diagram of a first engine and a second engine.

FIG. 6 shows a schematic diagram of a device for detecting drift of pilot according to an embodiment of the invention. As shown in FIG. 6, the device 600 may include a processor 602 and a memory 604. Wherein, the memory 604 may store executable instructions which, when executed, cause the processor 602 to carry out operations included in the method 400.

Embodiments of the invention also provide a program product comprising a readable storage medium storing executable instructions which, when executed, cause a machine to carry out operations included in the method 400.

Those skilled in the art will appreciate that various embodiments disclosed herein may be made variations, modified and/or adjusted without departing from the spirit of the invention, and such variations, modification and adjustments fall within the scope of protection of the invention. Accordingly, the scope of protection of the invention is defined by the appended claims.

The invention claimed is:

1. A method for detecting drift of pilot of an injector, the method comprising:
   measuring, when a first engine equipped with an injector is in an idle state, a first rotation speed and a second rotation speed, both of the first and second rotation speeds corresponding to at least one detection point of an injection curve measured under the condition that a current injection pressure of the injector is applied to the injector, wherein first rotation speed is a rotation speed of the first engine during a first working cycle of a cylinder of the first engine that is injected by the injector, the injector being energized for an energizing time indicated by the at least one injection point in a pilot period of the first working cycle, and the second rotation speed is a rotation speed of the first engine during a second working cycle of the cylinder where the injector is not energized in the pilot period of the second working cycle;

calculating a current engine rotation speed change corresponding to the at least one detection point by calculating a between the first rotational speed and the second rotational speed;

determining a difference between the current engine rotation speed change corresponding to the at least one detection point and a previously determined reference engine rotation speed change corresponding to the at least one detection point, the previously determined reference engine rotation speed change being measured when there is no drift of pilot in the injector;

acquiring an indication value corresponding to the at least one detection point, according to a difference between the current engine rotation speed change corresponding to that detection point and a reference engine rotation speed change; and determining whether there is drift of pilot in the injector, based on the indication value corresponding to the at least one detection point.

2. The method of claim 1, wherein the reference engine rotation speed change corresponding to the at least one detection point indicates a difference between a first reference rotation speed and a second reference rotation speed corresponding to the at least one detection point and are measured under the condition that a second engine equipped with the injector is in an idle state when there is no drift of pilot in the injector, wherein the first reference rotation speed is a rotation speed of the second engine during a first reference working cycle of a specified cylinder of the second engine that is injected by the injector, the injector being energized for an energizing time indicated by the at least one detection point in the pilot period of the first reference working cycle, and the second reference rotation speed is a rotation speed of the second engine during a second reference working cycle of the specified cylinder, the injector not being energized in the pilot period of the second reference working cycle.

3. The method of claim 1, wherein the first working cycle is followed immediately by the second working cycle.

4. The method of claim 2, wherein the first working cycle is followed immediately by the second working cycle.

5. The method of claim 1, wherein the reference engine rotation speed change corresponding to the at least one detection point indicates a difference between a first reference rotation speed and a second reference rotation speed corresponding to the at least one detection point, the first reference rotation speed and the second reference rotation speed are measured under the condition that the first engine equipped with the injector is in an idle state when there is no drift of pilot in the injector, wherein the first reference rotation speed is a rotation speed of the first engine during a first reference working cycle of a specified cylinder of the first engine that is injected by the injector, the injector being energized for an energizing time indicated by the at least one detection point in the pilot period of the first working cycle, and the second reference rotation speed is a rotation speed of the first engine during a second working cycle of the specified cylinder, the injector not being energized in the pilot period of the second working cycle.

6. An apparatus for detecting drift of pilot, comprising an electronic control unit configured to:

measure, when a first engine equipped with an injector is in an idle state, a first rotation speed and a second rotation speed, both of the first and second rotation speeds corresponding to at least one detection point of an injection curve measured under the condition that a current injection pressure of the injector is applied to the injector, wherein the first rotation speed is a rotation speed of the first engine during a first working cycle of a cylinder of the first engine that is injected by the injector, the injector being energized for an energizing time indicated by the at least one injection point in a pilot period of the first working cycle, and the second rotation speed is a rotation speed of the first engine during a second working cycle of the cylinder where the injector is not energized in the pilot period of the second working cycle;

calculate a current engine rotation speed change corresponding to the at least one detection point by calculating a difference between the first rotational speed and the second rotational speed, determine a difference between the current engine rotation speed change corresponding to the at least one detection point and a previously determined reference engine rotation speed change corresponding to the at least one detection point, the previously determined reference engine rotation speed change being measured when there is no drift of pilot in the injector;

acquire an indication value corresponding to the at least one detection point according to a difference between the current engine rotation speed change corresponding to that detection point and a reference engine rotation speed change; and determine whether there is drift of pilot in the injector, based on the indication value corresponding to the at least one detection point.

7. The apparatus of claim 6, wherein the reference engine rotation speed change corresponding to the at least one detection point indicates a difference between a first reference rotation speed and a second reference rotation speed corresponding to the at least one detection point and are measured under the condition that a second engine equipped with the injector is in an idle state when there is no drift of pilot in the injector, wherein the first reference rotation speed is a rotation speed of the second engine during a first reference working cycle of a specified cylinder of the second engine that is injected by the injector, the injector being energized for an energizing time indicated by that detection point in the pilot period of the first reference working cycle, and the second reference rotation speed is a rotation speed of the second engine during a second reference working cycle of the specified cylinder, the injector not being energized in the pilot period of the second reference working cycle.

8. The apparatus of claim 6, wherein the first working cycle is followed immediately by the second working cycle.

9. The apparatus of claim 7, wherein the first reference working cycle is followed immediately by the second reference working cycle.

10. The apparatus of claim 6, wherein the reference engine rotation speed change corresponding to the at least one detection point indicates a difference between a first reference rotation speed and a second reference rotation speed corresponding to the at least one detection point, the first reference rotation speed and the second reference rotation speed are measured under the condition that the first engine equipped with the injector is in an idle state when there is no drift of pilot in the injector, wherein the first reference rotation speed is a rotation speed of the first engine during a first reference working cycle of a specified cylinder of the first engine that is injected by the injector, the injector being energized for an energizing time indicated by the at least one detection point in the pilot period of the first working cycle, and the second reference rotation speed is a rotation speed of the first engine during a second working cycle of the specified cylinder, the injector not being energized in the pilot period of the second working cycle.

11. A device for detecting drift of pilot, comprising
an electronic processor; and
a memory for storing executable instructions which, when executed, cause the processor to carry out operations included in claim 1.

* * * * *